US00RE43120E

(19) United States
(12) Reissued Patent
Popov

(10) Patent Number: US RE43,120 E
(45) Date of Reissued Patent: Jan. 24, 2012

(54) ABRASIVE PLATE

(76) Inventor: Georgi M. Popov, Braselton, GA (US)

() Term: 14 Years**

(21) Appl. No.: 29/315,333

(22) Filed: Jun. 12, 2009

Related U.S. Patent Documents

Reissue of:
(64) Patent No.: Des. 587,288
Issued: Feb. 24, 2009
Appl. No.: 29/286,118
Filed: Apr. 24, 2007

U.S. Applications:
(62) Division of application No. 29/240,061, filed on Oct. 7, 2005, now Pat. No. Des. 541,124.

(51) LOC (9) Cl. ..... 15-09
(52) U.S. Cl. ..... D15/126; D10/70
(58) Field of Classification Search ..... D8/70; D15/124–126, 138–140; 83/589, 663, 676; 451/548–551
See application file for complete search history.

(56) References Cited

U.S. PATENT DOCUMENTS

| | | | | | |
|---|---|---|---|---|---|
| 141,413 | A | | 8/1873 | Armstrong | |
| D32,220 | S | | 2/1900 | Davis | |
| 1,260,326 | A | | 3/1918 | Cavicchi | |
| 1,954,560 | A | | 4/1934 | Cunningham | |
| D155,085 | S | | 9/1949 | Goldberg | |
| 5,458,532 | A | | 10/1995 | Cannone | |
| D382,452 | S | | 8/1997 | Murkowski et al. | |
| 5,782,682 | A | | 7/1998 | Han et al. | |
| 5,928,071 | A | * | 7/1999 | Devlin | 451/547 |
| D463,965 | S | | 10/2002 | Lee et al. | |
| D466,912 | S | | 12/2002 | Lee | |
| 6,551,181 | B2 | | 4/2003 | Lee | |
| D474,954 | S | | 5/2003 | Kim et al. | |
| D477,207 | S | | 7/2003 | Kim et al. | |
| D486,839 | S | | 2/2004 | Sunagawa et al. | |
| D494,196 | S | | 8/2004 | Jeong | |
| D503,602 | S | | 4/2005 | Hede | |
| D506,376 | S | | 6/2005 | Hede | |
| D509,121 | S | | 9/2005 | Hede | |
| D519,530 | S | | 4/2006 | Thysell et al. | |
| D548,757 | S | * | 8/2007 | Ruan | D15/126 |
| D549,746 | S | * | 8/2007 | Popov | D15/126 |
| D563,186 | S | * | 3/2008 | Ahn | D8/70 |
| 2002/0115398 | A1 | | 8/2002 | Lee et al. | |

* cited by examiner

*Primary Examiner* — Philip S Hyder
*Assistant Examiner* — Deanna Fluegeman
(74) *Attorney, Agent, or Firm* — Gardner Groff Greenwald & Villanueva, P.C.

(57) CLAIM

The ornamental design for an abrasive plate, as shown and described.

DESCRIPTION

FIG. 1 is a front perspective view of an abrasive plate of the present invention;
FIG. 2 is a front side view of the abrasive plate of FIG. 1;
FIG. 3 is a back side view of the abrasive plate of FIG. 1;
FIG. 4 is a left side view of the of the abrasive plate of FIG. 1;
FIG. 5 is a right side view of the abrasive plate of FIG. 1;
FIG. 6 is a top side view of the abrasive plate of FIG. 1; and,
FIG. 7 is a bottom side view of the abrasive plate of FIG. 1.
The broken lines in the drawings represent environmental structure only and form no part of the claimed design.

1 Claim, 3 Drawing Sheets

Figures 3, 4:
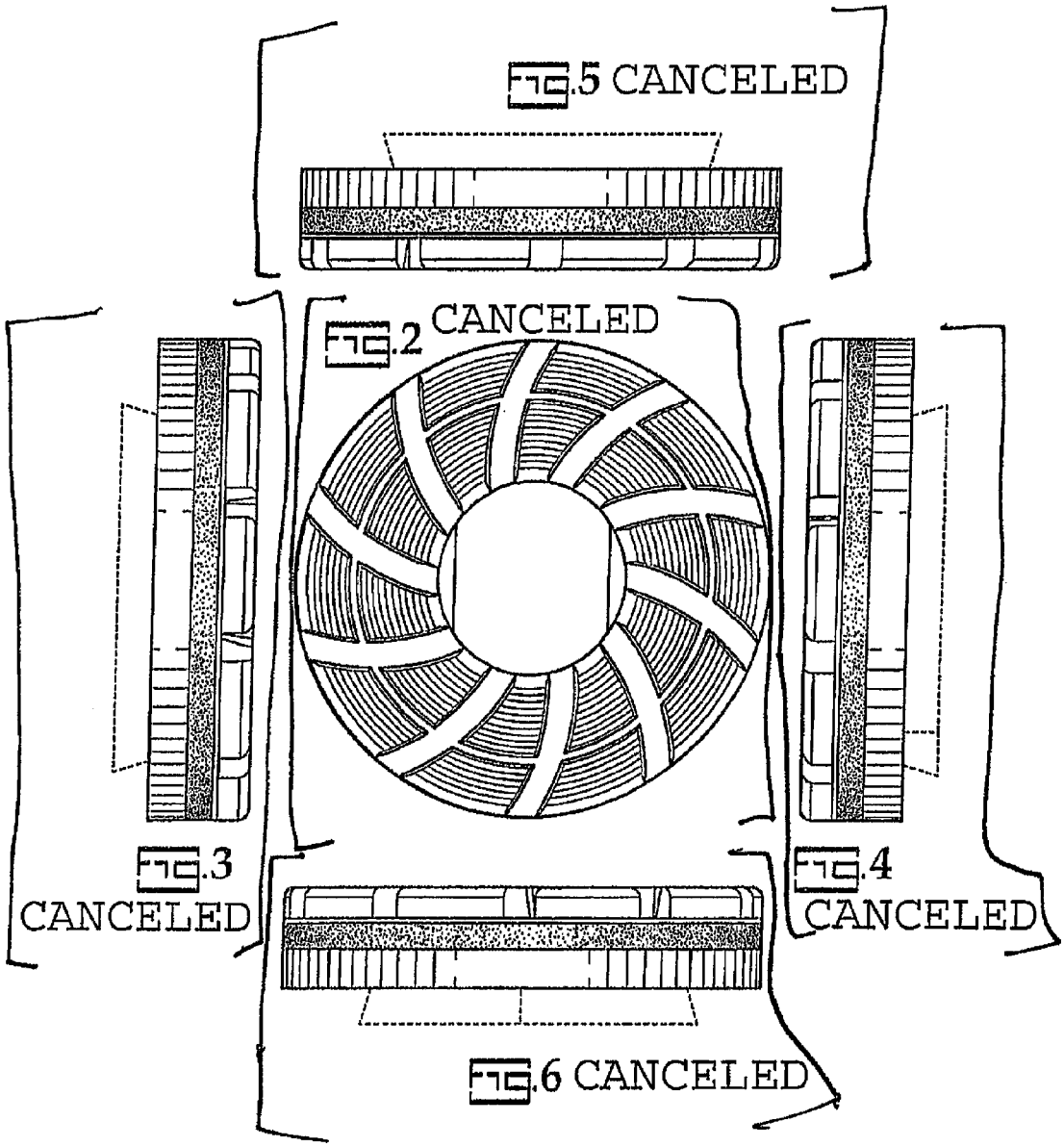

Matter enclosed in heavy brackets [ ] appears in the original patent, but forms no part of this reissue; matter printed in italics indicates the additions made by reissue.

AMENDED

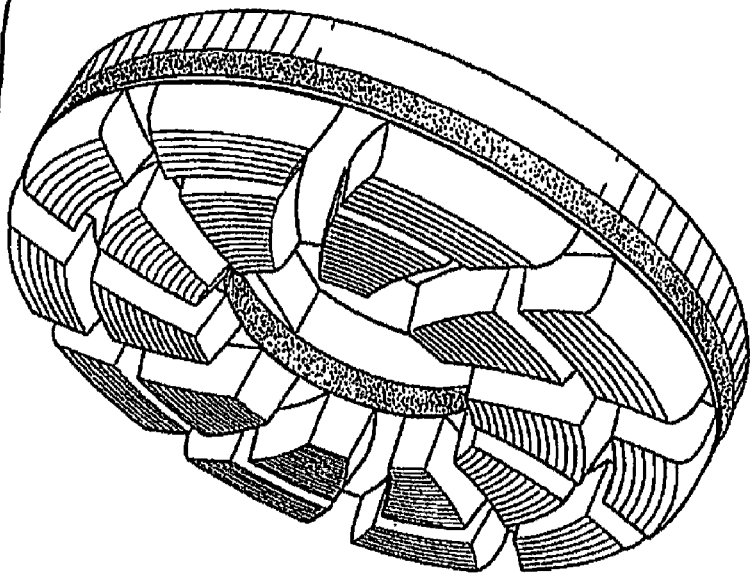
FIG. 1 CANCELED
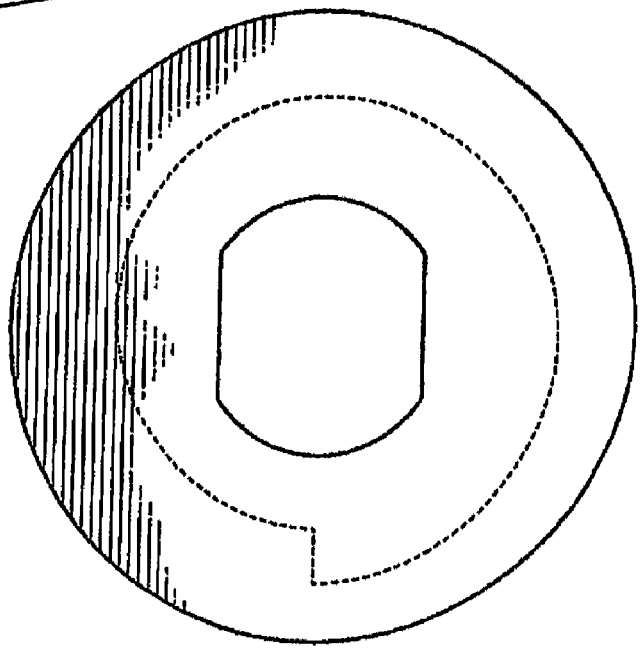
FIG. 7 CANCELED

FIG.5 CANCELED
FIG.2 CANCELED

CANCELED

CANCELED
FIG.6 CANCELED

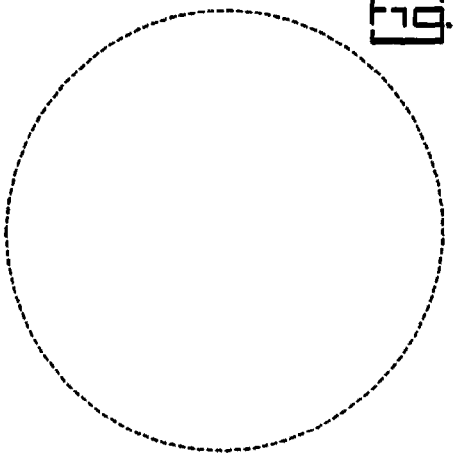

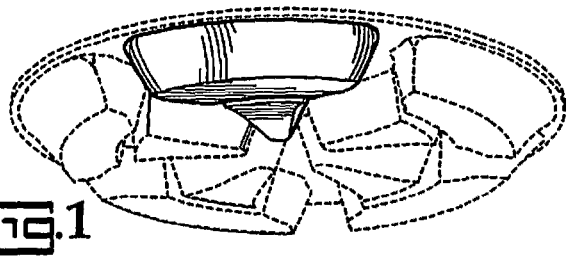
AMENDED FIG. 1
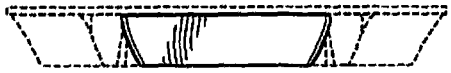
AMENDED FIG. 2
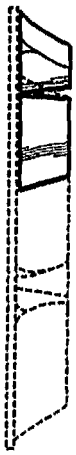
AMENDED FIG. 4
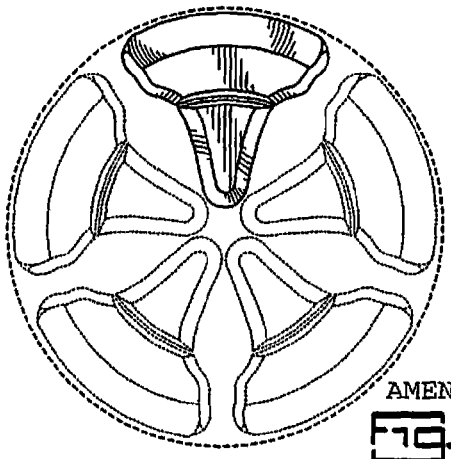
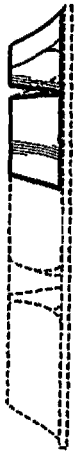
AMENDED FIG. 5
AMENDED FIG. 6
AMENDED FIG. 3
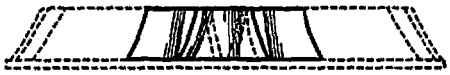
AMENDED FIG. 7